United States Patent Office  3,458,899
Patented Aug. 5, 1969

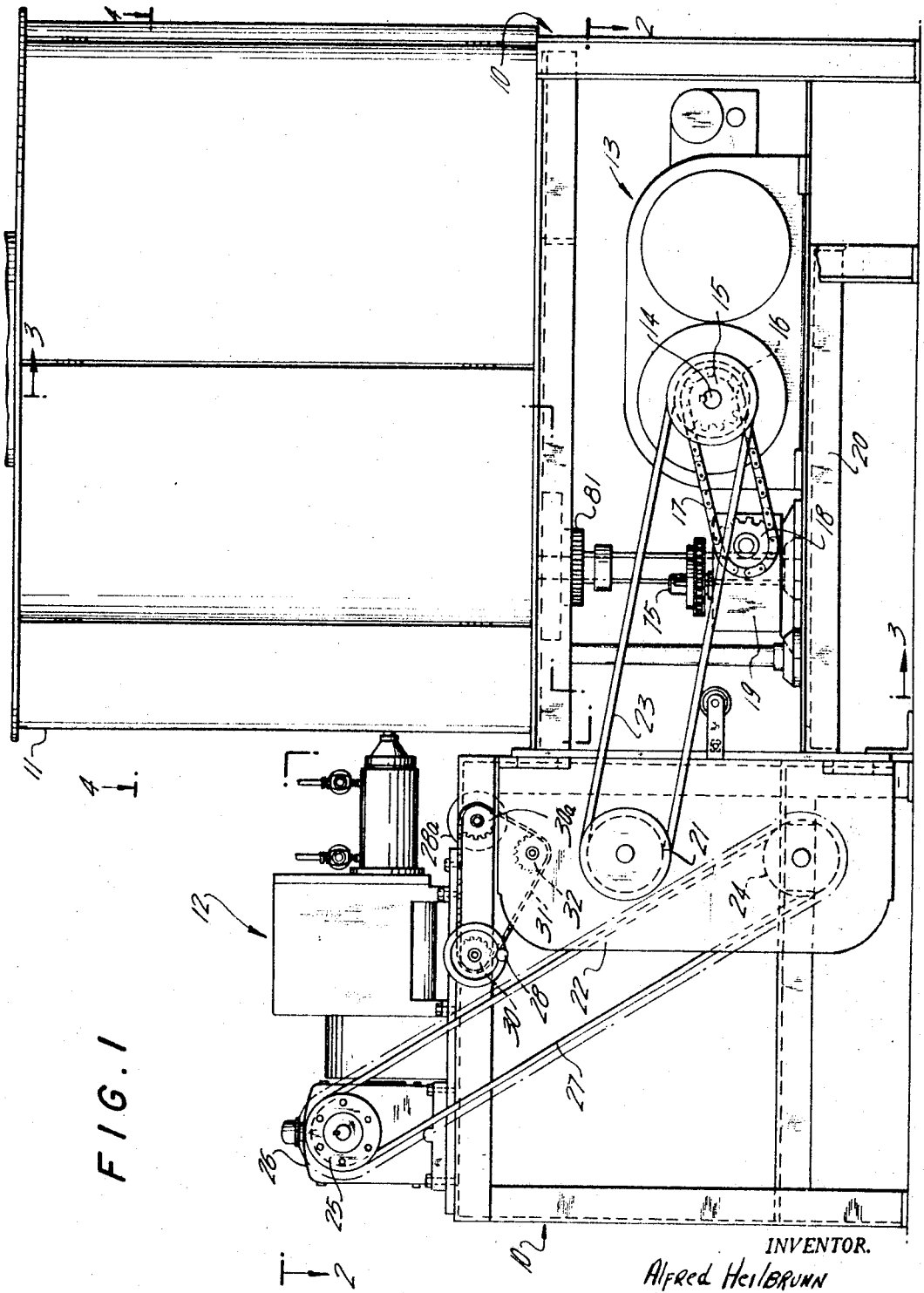

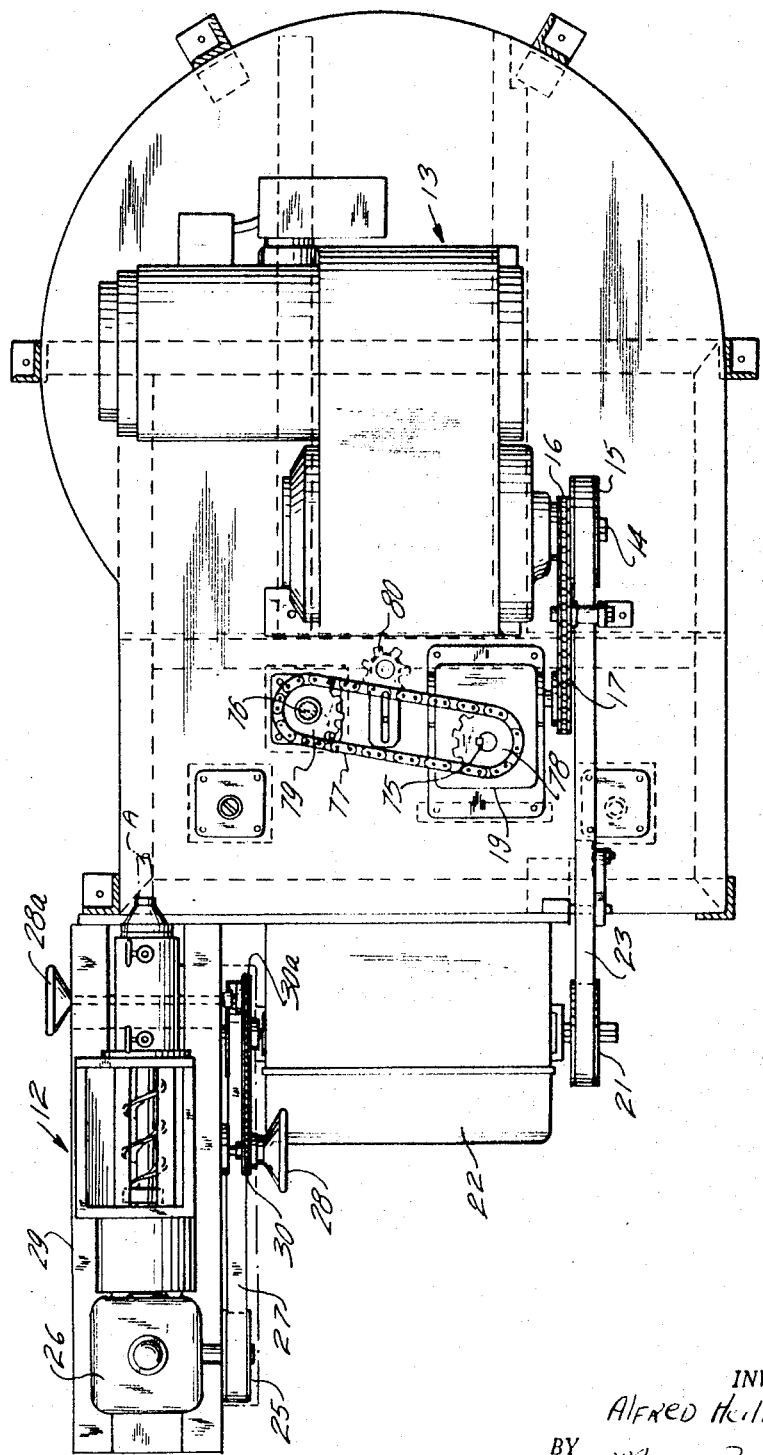

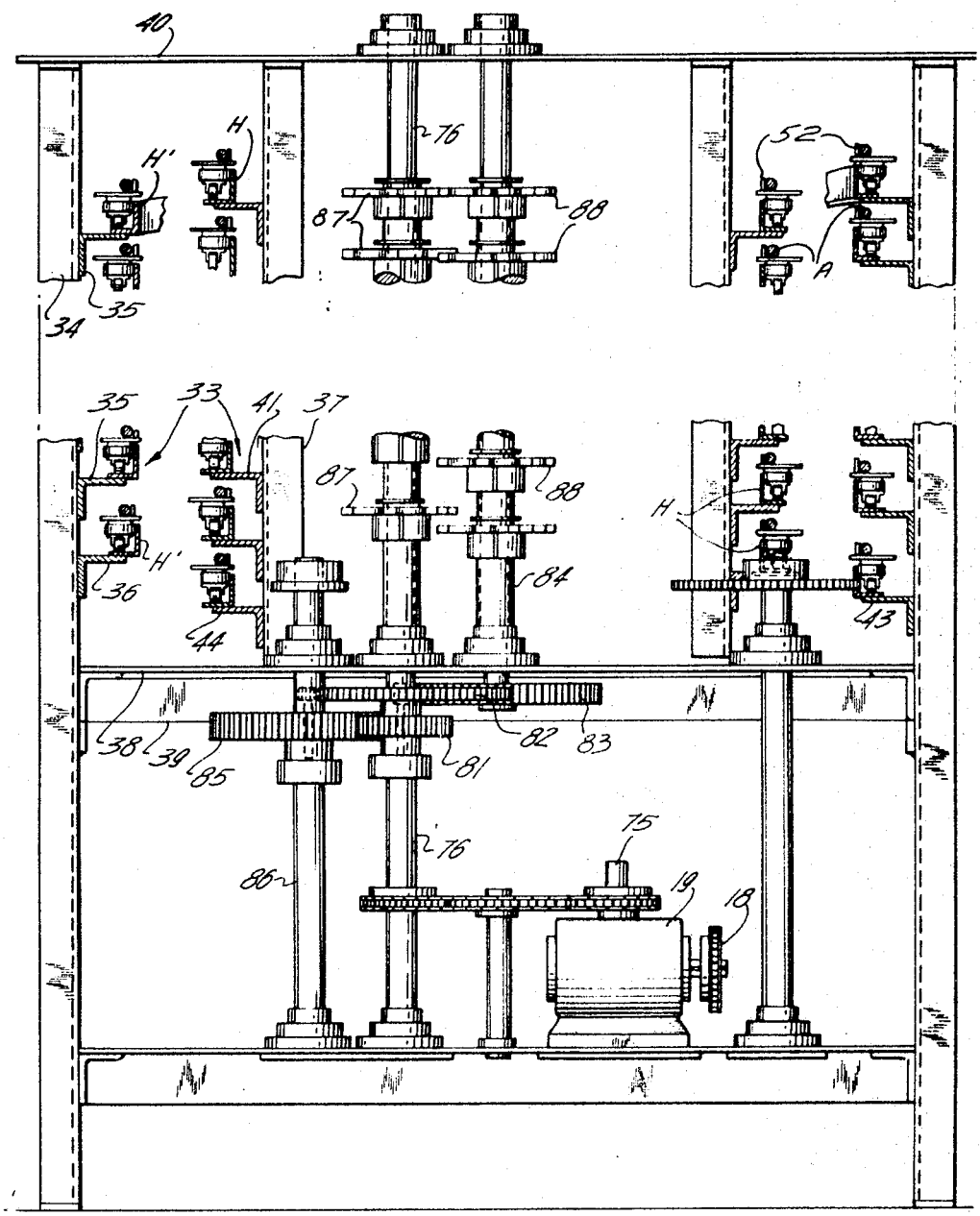

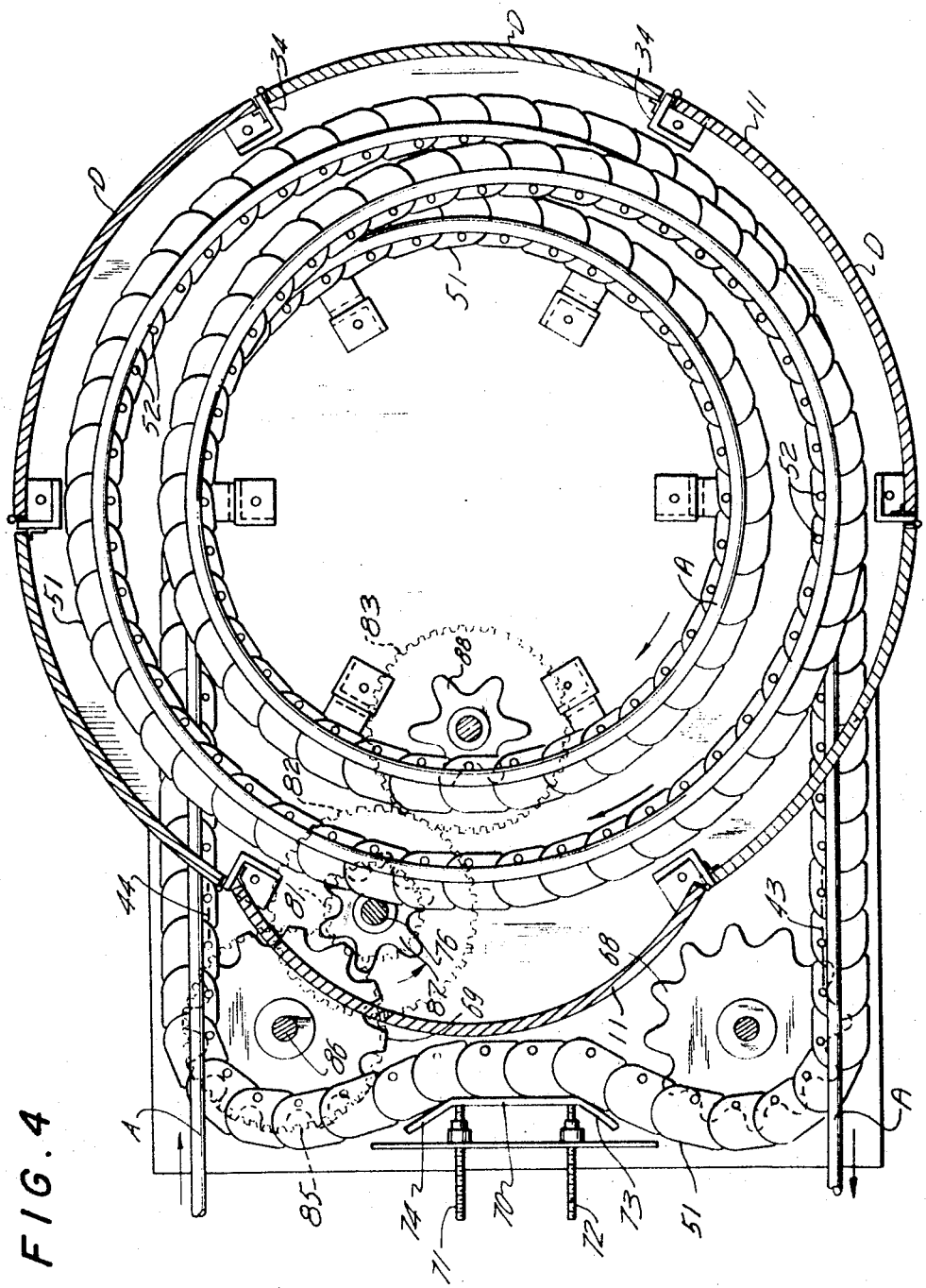

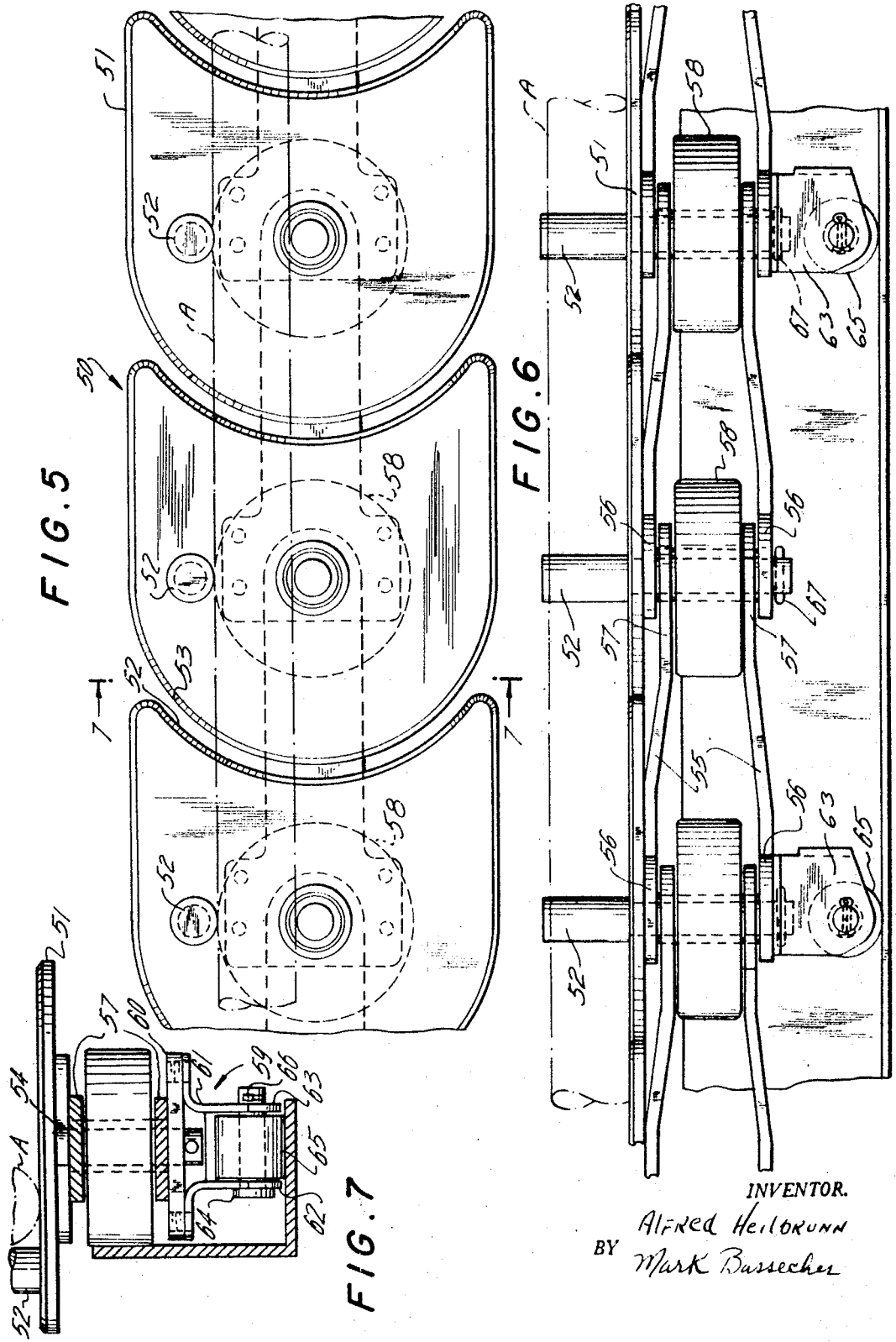

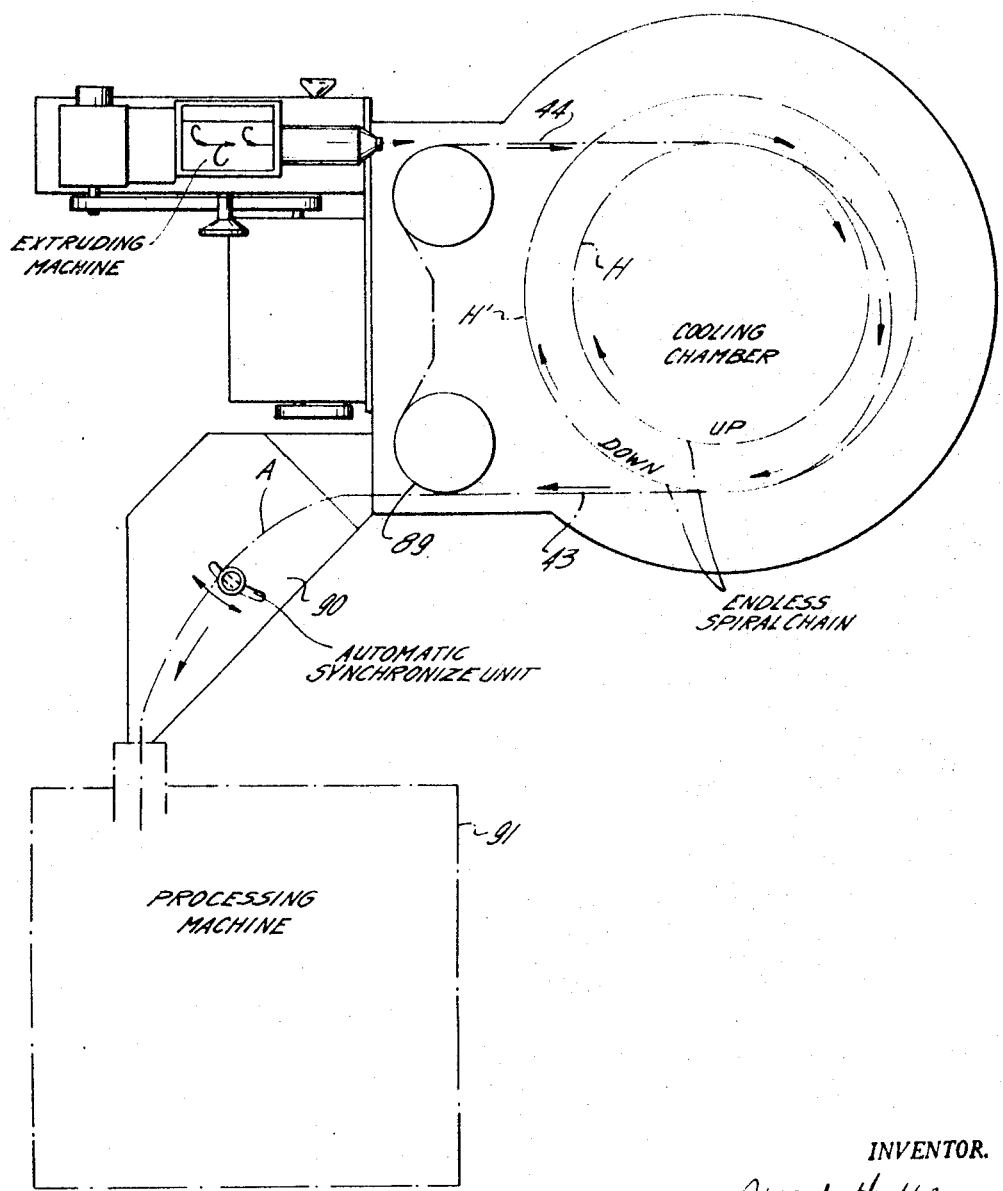

3,458,899
TREATMENT APPARATUS FOR
ELONGATED ARTICLE
Alfred Heilbrunn, Scranton, Pa., assignor to Topps Chewing Gum, Incorporated, Brooklyn, N.Y., a corporation of New York
Filed July 24, 1967, Ser. No. 655,503
Int. Cl. B29f 3/02; B65g 15/02
U.S. Cl. 18—6                                       14 Claims

ABSTRACT OF THE DISCLOSURE

A treatment apparatus for exposing a continuous article, such as an extrusion, to a particular environment with minimal working or flexure of the article, comprising an enclosure having disposed therein a conveyor, such as an endless chain having generally horizontally disposed article support surfaces, the conveyor or chain being disposed in a configuration defining at least two concentric helices, one helix surrounding the other, the pitch of one such helix being opposite to the pitch of the other helix.

BACKGROUND OF THE INVENTION

In many instances it is necessary or desirable, in the processing of continuous articles such as extrusions or the like, to expose the extruded article to preselected environmental conditions in the course of processing the article. As examples of such environments there may be mentioned cooling or heating environments, environments with particular moisture content or environments permeated with particular reagents, such as sulfur dioxide, ammonia, etc.

In construction apparatus for this purpose, it is desirable that the atmosphere be contained within the smallest possible volume since, obviously, efficient use of plant space is a desideratum. Similarly, if overall size of the article treatment enclosure is unduly large, there will be greater tendency toward efficiency losses due to leakage, heat transfer and the like.

When an article is to be subjected to cooling treatments within the enclosure, for instance, the greater the ratio of surface area of the enclosure to the volume of the enclosure, the more difficult it will be to maintain the temperature at all points within the enclosure within a predetermined selected range. Also, where a continuously produced article to be treated requires a predetermined time of exposure to the environmental conditions, it will be evident that, for maximum efficiency, a considerable length or quantity of the article be assembled within a minimal volume so that the space or volume required to be maintained at the treating environment conditions is as small as possible.

Where the atricle which is extruded is not mechanically strong, flexure of the article should be avoided since such flexure may induce flaws in the article. Also, where it is important for the article to maintain a preselected cross-sectional area, such flexure will induce undesirable variations.

A further desirable feature in an article treating device of the type described is that the entrance way to the processing or treatment device and the exit from such device be disposed in proximate relation to each other so that, in the event of mechanical failure in associated preceding or following apparatus, the operator will be sufficiently close to both of such preceding and following apparatuses to be in a position to observe the error and take proper corrective measures.

FIELD OF THE INVENTION

Description of the prior art

For the sake of simplicity the present invention will be discussed in connection with a chewing gum manufacturing process and the environment within the processing or article treatment apparatus will be a humidity controlled, cooling environment. However, it will be readily understood that the usefulness of the device is by no means restricted to chewing gum processing.

In chewing gum processing, for example, it is necessary that the rope or strand of gum, which is quite soft directly after leaving the extruder, be subjected to cooling for a predetermined period which is a function of the gum composition, the gum, after cooling, being advanced to wrapping or packaging equipment.

In accordance with certain processes heretofore known, the gum emerging from the extruder is cut into lengths and sugared to prevent adhesion of adjacent layers to each other or to processing equipment, and stored or aged in cooling receptacles. When the gum has achieved the desired consistency, it is removed from the receptacles. Ends or lengths of the gum are connected to each other and the composite is fed to conventional wrapping mechanisms.

It will be obvious that such process requires numerous handling steps, i.e. sugaring of the gum; removal of the extruded gum to the cooling receptacle; removal of the treated gum from the cooling receptacle; joining of the gum ends to each other; disposition of the gum at the entrance of the packaging mechanisms, etc.

Attempts to provide a continuous processing mechanism wherein the strand emerging from the extruder is processed by cooling and, without being broken, is led to the wrapping mechanism, have heretofore never been commercially practicable.

In some instances, attempts have been made to place the extruded gum rope on an elongated conveyor disposed within a cooling chamber, thereby separating the extruder from the packaging apparatus by a very extended length of conveyor. Obviously, such conveyor takes up a considerable amount of plant space, in view of the requirement that the conveyor be elongated to a considerable degree to provide sufficient time for cooling of the gum from the heated condition in which it is extruded to the cooled condition in which it is to be wrapped.

Aside from the inefficiency inherent in the provision of an elongated conveyor, it is nearly impossible to maintain all zones within the conveyor at a preselected desirable temperature and humidity range.

Also, in view of the length of the conveyor which would be required, the extruder and packaging apparatuses, which are necessarily located at opposite terminal ends of the conveyor, would have to be spaced apart a considerable length, sometimes in excess of several hundred feet. Thus, in the event of a failure at the extruding or packaging end, communication between operators at either end of the conveyor would be necessary to correct any deficiency, interrupting the operation of one or more parts of the apparatus, etc.

SUMMARY OF THE INVENTION

The present invention relates to a treatment apparatus for elongated articles, and particularly for extruded articles, and comprises an enclosure having juxtaposed entrance and exit ways, and an endless conveyor internally of the enclosure having loading and unloading stations adjacent the entrance and exit ways, respectively, the conveyor being configured in the form of a pair of coaxial helices, one surrounding the other, the pitch of the helices being opposite to each other, the device including drive mechanism engaging each convolute of the endless conveyor.

The invention further relates to a device of the class described in combination with an extruder apparatus feeding material to the treatment apparatus and a processing apparatus receiving the material from the exit way, the extruder and treatment apparatus being driven at a predetermined speed ratio to each other, the combination including sensing means for sensing the demand for material emerging from the treatment apparatus by said processing apparatus, and increasing or decreasing the speed of the treatment apparatus and extruder in response to the demand.

Accordingly, it is an object of the invention to provide an improved treatment apparatus for the efficient treatment of an elongated article, such as an extrusion.

A further object of the invention is the provision of a treatment apparatus of the type described which handles the continuous material without appreciable flexure or working of the material in the course of traversing the apparatus.

A further object of the invention is the provision of an apparatus of the class described which is compact, providing within a relatively limited area, facilities for treating an extended length of extruded material.

A further object of the invention is the provision, in combination, of an extruder, treatment apparatus for the extruded material, processing means for operating on the material emerging from the treatment apparatus and speed sensing means controlling the speed of the extruder and treatment apparatus in response to the demand for material of the processing apparatus.

To attain these objects and such further objects as may appear herein or be hereinafter pointed out, reference is made to the accompanying drawings, forming a part hereof, in which:

FIGURE 1 is a side elevational view of an assembly of the type described;

FIGURE 2 is a discontinuous section taken on the line 2—2 of FIGURE 1;

FIGURE 3 is a magnified discontinuous vertical section taken on the line 3—3 of FIGURE 2;

FIGURE 4 is a horizontal sectional view taken on the line 4—4 of FIGURE 1;

FIGURE 5 is a magnified plan view of a section of the conveyor chain used in the combination of the invention;

FIGURE 6 is a side elevational view of the chain of FIGURE 5;

FIGURE 7 is a section taken on the line 7—7 of FIGURE 5;

FIGURE 8 is a diagrammatic plan view of the treatment apparatus in conjunction with an extruding machine, a processing machine such as a wrapper, and an automatic synchronizing unit.

In accordance with the invention, 10 is a frame on which is supported an enclosure 11, within which is located the article treatment apparatus. In the illustrated embodiment there is shown an extruder unit 12 which feeds extruded material to the treatment enclosure 11.

The extruder and treatment apparatus are both driven by a variable speed drive assembly 13, which is essentially conventional in its operation, and includes a power take-off shaft 14, to which shaft is keyed a treatment drive sprocket 15 and an extruder drive pulley 16. The drive sprocket 15 is connected by chain 17 to the input sprocket 18 of speed reducer 19, all of which parts are mounted on a sub-frame structure 20, affixed, as by welding, to the main frame 10.

The drive pulley 16 is connected to input pulley 21 of the extruder drive mechanism 22 by belt 23.

The extruder drive assembly 22 incorporates an output pulley 24 coupled to pulley 25 of the extruder speed reduction assembly 26 by drive belt 27.

A pair of hand wheels 28, 28a are disposed at opposite sides of the extruder support table 29, the wheels 28, 28a being connected with sprocket members 30, 30a, respectively. A sprocket chain 31 couples the sprocket members 30, 30a to each other and to a speed change sprocket 32 within the extruder drive mechanism 22.

It will be understood, without a full description of the apparatus whereby this is effected, that by rotation of the speed control wheels 28 or 28a, which are accessible at either side of the table 29, it is possible to increase or decrease the speed of the extruder in relation to the treatment apparatus without at the same time varying the speed of the treatment apparatus.

It is further to be noted that the drive shaft 14 of the motor assembly 13 may be caused to increase or decrease in speed by control apparatus hereinafter to be described. However, despite any increase or decrease induced by the speed of rotation of the shaft 14, it will be understood that the speed ratio of the treatment apparatus and the extruder member will remain the same, unless varied by operation of one of the hand wheels 28, 28a.

Within the enclosure 11 there is disposed a track 33, on which track is supported an endless conveyor chain. The track takes the form of a pair of coaxial helices or spirals, one of which surrounds the other, the pitch or inclination of the two helices being opposite one another.

For simplicity of description, the track or guide defining components, which are generally L shaped in vertical section, will be described in accordance with their location as part of the inner helix H or the outer helix H'.

The components of the track forming the outer helix H' are supported from a series of outer vertical struts 34 extending inwardly from the inner perimeter of the enclosure 11, six such struts being illustrated. Each of the struts 34 has welded thereto, at vertical spaced increments along the length thereof, a series of inverted L brackets 35. The continuous track defining the convolutions of the outer helix H' is generally L shaped in vertical section at any point along its length, increments of the track, where it crosses the brackets 35, being welded or otherwise fastened to the horizontal legs 36 of the brackets.

The inner helix H is supported in similar fashion. For this purpose, a series of inner structs 37, six being illustrated, extend vertically between bottom plate 38, which is mounted on cross beams 39, and top plate 40 affixed to the upper ends of the outside struts 34. A series of L brackets 41 are welded at vertical spaced increments along the struts 37, the horizontal surfaces 42 of the brackets 41 being affixed to the inner helix components H which, like the helix components H', are L shaped in vertical section.

From the foregoing it will be understood, as best seen in FIGURE 3, viewed in vertical section, that the helices H and H' are defined by a continuous track member which is L shaped in vertical section, the upright leg of the L being generally vertically disposed, and the base of the L, in each instance, being horizontally disposed and directed radially toward the nearest adjacent wall of the enclosure 11.

The lowermost section of the outer helix H' terminates in a forwardly extending straight run 43—see FIGURE 3, and also diagrammatically shown in FIGURE 8—this track section forming a support for the delivery or output section of conveyor mounted on the track.

In a similar manner, a longitudinally extending section 44 leads to the lowermost convolute of the inner helix H, the track section 44 carrying a straight run of the conveyor defining the input to the treatment apparatus.

THE CHAIN MECHANISM

There will next be described a chain mechanism which is supported on the previously described helically arranged guideways.

The chain or conveyor, which is generally referred to by reference number 50, comprises a series of links, each including a generally horizontally disposed support table 51 which actually carries the article A being treated. The support table 51 includes an upwardly extending abutment member 52, providing a guide to prevent inward movement of the article A with respect to the table 51. The table 51, in plan, includes a forward surface defining a concave, arcuate portion 52, the rear surface 53 of each of the table portions 51 being formed with a complemental convex, arcuate component. As will be best appreciated from FIGURE 5, the arcuate configuration or interfit of the leading and trailing parts of the adjacent tables permits a degree of relative movement of one table with respect to the other table in the plane of the tables, without the necessity for providing an undue spacing between the tables.

A pivot pin 54 is fastened to each of the tables 50 and extends beneath the tables. The pivot pins 54 of adjacent tables are connected to each other by a pair of generally horizontally disposed link members 55, 55, the ends 56, 56 of the links 55 being apertured and the pins 54 passing through the registering apertures in the links.

The opposite ends 57 of the links are similarly apertured, the ends 57, by reason of a bend formed in the links 55, being spaced apart a lesser distance than the ends 56 of the links.

As best seen in FIGURE 6, the more closely spaced ends 57 of the links 55 are nested within the more widely spaced ends 56 of the next adjacent set of links. In the space between the link ends 57, there is carried a roller member 58, rotatable about the vertical axis provided by the pins 54. In addition, pins 54 of every other link are provided with a support roller assembly 59 comprising a horizontally disposed platform 60, to which is bolted a clevis 61 comprising spaced legs 62, 63. The legs 62, 63 are provided with spaced, registering apertures through which a pin 64 is mounted, a roller 65 being rotatably supported on the pin. A cotter pin 66 locks the pin 64 in the clevis.

In a similar manner, cotter pins 67 pass through the vertical pin 54, locking the table and its associated pin from upward removal from apertures formed in the platform 60.

From the foregoing it will be evident that there is described a chain which is permitted a considerable degree of articulating movement in the plane of the table 51, with a limited degree of articulating movement in a plane normal to the table being permitted by the clearances formed in the chain connecting members.

THE CHAIN MOUNTING

The chain is convoluted about the helices H, H', with the support rollers 65 engaging the horizontally disposed portions of the L shaped guides forming the track H and H' and with the side of rollers 58 engaging against the vertically disposed walls of said L shaped tracks.

The straight or terminal track portions 43, 44 defining, respectively, the exit and entrance ways to the conveyor, extend outwardly through suitable openings formed in the wall of the enclosure 11 adjacent one of the extremities, preferably the lower extremity, of the enclosure. The tracks 43, 44 terminate short of guide sprockets 68, 69, the teeth of which sprockets enter into the spaces between the rollers 58 for support and driving movement of the chain.

The chain is bent at a relatively sharp angle about the sprocket 68, the radius of curvature of the chain at this point being considerably less than the radius of curvature of either of the helices.

In similar manner, the chain passes over sprocket 68, tension in the chain being adjusted by variable compression member 70. The compression member 70 is supported on threaded means 71, 72 affixed to the frame and includes beveled entry and exit portions 73, 74 which function variably to articulate the chain as it passes the member 70 to remove any undesired slack from the chain.

CHAIN DRIVE MECHANISM

Referring now to FIGURE 2, as previously described the main motor shaft 14 drives the input sprocket 18 of a speed reducer mechanism 19. The output shaft 75 of the speed reducer mechanism is connected to input shaft 76 of the conveyor drive by a drive chain 77, linking sprocket 78 carried by shaft 75 with sprocket 79 of the input shaft 76. A chain tensioner member 80 may be employed to maintain a constant tension in the chain 77.

Vertical shaft 76, which is carried in suitable thrust bearings mounted to the frame, extends the entire height of the unit. Spaced drive gears 81, 82 are mounted to the shaft 76 at intermediate positions along the length thereof. Drive gear 82 meshes, in turn, on a 1:1 ratio with a take-off gear 83 carried by inner chain drive shaft 84. Thus, it will be evident that the shaft 84 will be driven at the same speed but in an opposite direction from the shaft 76.

The gear 81 meshes with drive gear 85 carried by shaft 86, which shaft also carries the sprocket 69. It will be observed that due to the ratio of gears 81 and 85, the shaft 86 will be driven at a slower rate of speed than shaft 76.

To the shaft 76, as best seen in FIGURES 3 and 4, there are mounted a series of vertically spaced apart chain drive sprockets 87, the sprockets being spaced to coincide with each convolution of the chain 50 which is supported on the outer helical member H'. In similar manner, a series of spaced sprockets 88 are mounted on counter-rotating shaft 84, the sprockets 88 extending into the spaces between rollers 58, to drive the chain links of the chain 50 on the inner helical portion H. Suitable cutouts are provided in the inner helix to provide access for the sprockets 88 to the chain.

From the foregoing it will be seen that with the shaft 76 driven in a counter-clockwise direction as viewed in FIGURE 4, the chain will be driven clockwisely about a continuous path defined by entrance 44 to the inner helix H, thence upwardly about the inner helix, crossing over at the top of the inner helix to the top of the outer helix H', thence gradually downwardly until reaching the terminal end or straight run 43 of the outer helix.

Although the sprocket 69 carried by shaft 86 is larger than the drive sprockets 87 and 88, it will be recalled that since the shaft 86 is rotating at a lower speed than shaft 76, the linear speed of sprocket 69 is the same as the linear speeds of the sprockets 87 and 88.

In the illustrated embodiment, sprocket 68 is disclosed as being an idler sprocket, to maintain tension on the chain and dispose the same in the desired configuration. It will be readily understood that, if desired, proper drive mechanism may be employed, to providing a driving influence by the sprocket 68 on the chain.

The use of drive sprockets engaging the inner and outer helices at each convolution has been found greatly to reduce the inherent friction and facilitate the driving of the mechanism. Similarly, since a slightly greater amount of chain is being driven in a downward direction than is being driven in an upward direction, the not inconsiderable weight factor of the chain is, to a great degree, nullified.

The efficiency gained by driving each convolution of the chain and by the up and down configuration of the chain is so great as to permit the driving of a heavy chain approximately 340 feet in length with a 1 horse power motor, the configuration of the chain being such that the helix diameter of the outer helix approximates 36 inches and that of the inner helix approximates 30 inches.

As an indication of the compactness of the conveyor mechanism, the 340 feet of conveyor chain may be enclosed within an enclosure 11 whose outer dimensions are approximately 5½ feet in height and approximately 5 feet in diameter.

Optionally but preferably, a series of doors D may be provided in the walls of the enclosure 11 so as to permit access to various parts of the interior for purposes of cleaning and the like.

The provision of the sharp bend of the chain about the sprocket 69 facilitates the unloading of the extruded article A from the chain, since the article tends to continue in a straight or slightly curved path which is angularly related to the curvature of the sprocket curvature.

When the device is used in the processing of chewing gum, for instance, the extruded gum rope A passes along the entrance way 44 of the conveyor into the interior. As the article traverses the inner helix H, it acquires a slight set or radius, which radius is continued in the course of traversing the inner helix and is slightly enlarged from the inner helix H to the outer helix H'. In the case of chewing gum, the environment to which the material is subjected is a cooling environment and in response thereto the material is considerably stiffer as it continues down the outer helix. As it reaches the exit portion 43, the article is straightened by engagement with the chain abutments 52 which are aligned in essentially a straight line in this area.

The chain is bent abruptly over the sprocket 68, which abrupt bend tends to separate the article from the conveyor, the article continuing in a straight direction.

In accordance with a preferred embodiment, the article A emerging from the discharge station or area 89—see FIGURE 8—is passed over an automatic synchronizing unit 90 which may be constructed in accordance with my copending application Ser. No. 614,467, filed Feb. 7, 1967, entitled Article Feed Control. The function of the synchronizing unit is to sense the demand for the extruded article as evidenced by the processing machine 91 so as to increase the speed of the extruder and conveyor unit in the event that the processing machine requires a greater supply of the extruded material and, conversely, to decelerate the machine if the processing machine is provided with an over-supply.

From the foregoing it will be appreciated that the device of the present invention provides a compact and highly efficient article treatment apparatus, particularly suitable for treatment of extended, continuous articles such as extrusions. The device is characterized by the ability to treat extended lengths within a compact area, the in-feed and discharge portions of the device being disposed in close proximity to each other.

Due to the novel configuration assumed by the chain or other conveyor, minimal flexure or bending of the extrusion or other article is encountered. Also, since the downwardly traveling outer helix is of larger diameter than the inner helix, somewhat more of the chain is travelling in a downward direction at any one time than in an upward direction, thus increasing the efficiency of the device by reducing the forces necessary for driving the chain.

While the device has been illustrated in connection with two coaxially disposed helical configurations, one surrounding the other, it will be apparent to the skilled worker in the art that it is feasible to operate the device with more than two such helical configurations.

In combination with an extruder for feeding the apparatus and processing mechanism for receiving and performing subsequent operations on the article treated, the apparatus provides a continuous manufacturing unit which may be easily controlled with a minimum of supervision, many of the control functions being automatically performed and other of the functions being susceptible of performance by a single operator stationed at or near the juxtaposed input and outlet stations of the treatment apparatus.

In the device in accordance with the invention, the ratio of treatment footage to area occupied is extremely high, resulting in the efficient use of plant space and maintenance of desired environmental conditions.

When used in the field of processing chewing gum, the apparatus for the first time enables continuous production from extrusion to wrapping without the wasteful intermediate steps of cutting, aging, surgaring, reconnecting and finally processing.

As previously noted, the apparatus may be used with elongated products other than extruded products and for treatment environments other than heating and cooling environments. Where the apparatus is used for exposure of an item to a gaseous reagent, for instance, it will be necessary, in accordance with standard practice, to prevent the reagent from escaping from the entrance and exit portions through the use of pressure chambers or other sealing means.

Having thus described the invention and illustrated its use, what is claimed as new and is desired to be secured by Letters Patent is:

1. A processing apparatus comprising an enclosure, an endless chain member including link portions connected for horizontal and vertical relative flexural movement disposed within said enclosure, generally horizontally disposed article support surfaces on said links, track means in said container configurated to define inner and outer coaxial, generally helical guide surfaces, one surrounded by the other, the inclination of the inner said guide surface being opposite the inclination of the outer said surface, said chain being slidably supported on said track means in successive flights corresponding to the convolutions of said inner and outer helices, and drive means for advancing said chain in a continuous path corresponding to said helices.

2. An apparatus in accordance with claim 1 wherein the radii of curvature of said inner and outer helices are generally similar, and including a discharge station defined by an abrupt variation of configuration of said chain from said radii.

3. A device in accordance with claim 2 wherein said abrupt variation comprises a bend in said chain of smaller radius than the radii of said helices.

4. A device in accordance with claim 1 wherein said enclosure includes upper and lower extremities and input and output stations adjacent one terminal end of said enclosure, said input and output stations being defined adjacent the ends of a short chain section extending from the end of one of said helix to the beginning of the other said helix.

5. A device in accordance with claim 1 wherein said chain links include first and second guide roller means rotatable about horizontal and vertical axes, respectively, and said track means include horizontal and verticle wall components engaging, respectively, said first and second guide means.

6. A device in accordance with claim 5 wherein said article support surfaces of said links include upwardly directed abutment portions disposed adjacent portions of said surfaces nearest the axis of said helices.

7. A device in accordance with claim 1 wherein said drive means includes a drive sprocket member drivingly engaging each convolution of said chain.

8. An article treatment apparatus for processing a continuous flexible article, such as an extruded member, with minimal flexure of said member, comprising an enclosure having a selected treatment environment, an endless conveyor member in said enclosure having a generally horizontally disposed article support surface, said conveyor member being arranged in a configuration generally defining two concentric helices, one surrounded by the other, the inclination of the inner helix being opposite that of the outer helix.

9. A device in accordance with claim 8 wherein the upper and lower terminal convolutions of said helices are disposed, respectively, adjacent the upper and lower ends of said enclosure, said device including input and output stations disposed adjacent one of said ends.

10. A device in accordance with claim 9 wherein said stations are in generally coplanar alignment with each other and with one of said terminal convolutions.

11. A device in accordance with claim 8 and including a linking section of said conveyor extending from a terminal convolution of one said helix to the adjacent terminal convolution of the other said helix, said linking sections including a discharge portion characterized by an abrupt change of path of said conveyor from the path occupied by said conveyor when traversing said helices, whereby a continuous article carried by said conveyor and configurated in accordance with said helices will be caused to depart from said conveyor at said discharge portion.

12. In combination, an extruder member, an article treatment apparatus having an enclosure with a selected treatment environment, an entrance way formed adjacent an extremity of said enclosure in juxtaposition to said extruder member, an endless conveyor member in said enclosure having a generally horizontally disposed article support surface, said conveyor being arranged in a configuration defining two concentric helices, one surrounded by the other, the pitch of the inner helix being opposite that of the outer helix, an exit way formed in said enclosure in proximate spaced relation to the entrance way, load and discharge stations on said conveyor adjacent said entrance and exit ways, respectively, a processing apparatus positioned outside said enclosure adjacent said exit way, drive means for driving said extruder and conveyor in timed relation and drive speed control means interposed between said exit way and said processing apparatus for varying the speed of said drive means responsive to the demand of said processing apparatus for material emerging from said exit way.

13. A device in accordance with claim 12 and including means for varying the speed ratio of said extruder with respect to said conveyor.

14. A device in accordance with claim 1 wherein said drive means includes a plurality of drive sprocket members drivingly engaging spaced convolutions of the chain of said inner and outer helices, whereby binding of the chain against said guide surface is prevented.

References Cited

UNITED STATES PATENTS

| | | | |
|---|---|---|---|
| 2,200,735 | 5/1940 | Batten | 18—6 |
| 2,476,868 | 7/1949 | Halbert | 18—6 |
| 2,627,083 | 2/1953 | Witthoft | 18—6 |
| 3,348,659 | 10/1967 | Roinestad | 198—136 |

WILLIAM J. STEPHENSON, Primary Examiner

U.S. Cl. X.R.

104—106; 198—136; 260—170